(12) United States Patent
Gradine et al.

(10) Patent No.: US 7,515,100 B2
(45) Date of Patent: Apr. 7, 2009

(54) METHOD AND SYSTEM FOR INITIATING REAL-TIME KINEMATIC NETWORK OPERATIONS

(75) Inventors: Erik Gradine, Adair Village, OR (US); Graham Briggs, Corvallis, OR (US)

(73) Assignee: Trimble Navigation Limited, Sunnyvale, CA (US)

( * ) Notice: Subject to any disclaimer, the term of this patent is extended or adjusted under 35 U.S.C. 154(b) by 216 days.

(21) Appl. No.: 11/588,626

(22) Filed: Oct. 27, 2006

(65) Prior Publication Data

US 2008/0100506 A1    May 1, 2008

(51) Int. Cl.
*G01S 5/14* (2006.01)
(52) U.S. Cl. ............................ 342/357.03; 342/357.08
(58) Field of Classification Search ............ 342/357.03, 342/357.08
See application file for complete search history.

(56) References Cited

U.S. PATENT DOCUMENTS 5,519,620 A * 5/1996 Talbot et al. ........... 342/357.03
5,784,027 A    7/1998 Davis
5,914,675 A * 6/1999 Tognazzini ................. 342/457
2005/0080563 A1 * 4/2005 Petrovski et al. ....... 342/357.06

FOREIGN PATENT DOCUMENTS

DE    019646603 A1 * 7/1997

OTHER PUBLICATIONS

English Translation of DE 019646603 A1.*

* cited by examiner

*Primary Examiner*—Thomas H Tarcza
*Assistant Examiner*—Fred H Mull

(57) ABSTRACT

Embodiments of the present invention recite methods and systems for expediting the initiating of Real-Time Kinematic (RTK) network operations. In one embodiment, an RTK base station is disposed at a known location. A broadcast position of the RTK base station is then determined. In embodiments of the present invention, the determining of the broadcast position does not require using the geographic coordinates of said known location.

23 Claims, 16 Drawing Sheets

200

METHOD AND SYSTEM FOR INITIATING REAL-TIME KINEMATIC NETWORK OPERATIONS

FIELD OF THE INVENTION

Embodiments of the present invention relate to land surveying. More specifically, embodiments of the present invention relate to expediting the initiation of Real-Time Kinematic (RTK) operations.

BACKGROUND OF THE INVENTION

Global Navigation Satellite Systems (GNSS) is a collective term for a variety of satellite navigation systems which use orbiting satellites as navigation reference points to determine position fixes on the ground. GNSS includes the Global Positioning System (GPS), the Global Navigation Satellite System (GLONASS), Galileo, the European Geostationary Navigation Overlay (EGNOS), Doppler Orbitography and Radiopositioning Integrated by Satellite (DORIS), the Wide Area Augmentation Service (WAAS), and the Compass system. GNSS is increasingly used in a wide variety of applications including surveying.

In typical civilian applications, a single GNSS receiver can measure a ground position with a precision of about ten meters. This is, in part, due to various error contributions which often reduce the precision of determining a position fix. For example, as the GNSS signals pass through the ionosphere and troposphere, propagation delays may occur. Other factors which may reduce the precision of determining a position fix may include satellite clock errors, GNSS receiver clock errors, and satellite position errors (ephemeredes). One method for improving the precision for determining a position fix is called Real-Time Kinematic (RTK) GNSS.

FIGS. 1A, 1B, and 1C illustrate steps performed initiating and operating an exemplary conventional RTK system. In FIG. 1A, an RTK base station 105 is disposed above a known location 101. Typically, the geographic coordinates (e.g., latitude, longitude, and elevation) known location are surveyed with a high degree of precision. Also, a typical RTK base station (e.g., 105) comprises a GNSS antenna, GNSS receiver, and a wireless broadcasting data link.

To initiate RTK base station 105, the power is initialized and RTK base station 105 attempts to determine its geographic location (e.g., the geographic coordinates of known location 101). However, due to the combination of error contributions discussed above, the precision with which RTK base station 105 can determine its own geographic position is within a 10 meter radius (e.g., 115 of FIG. 1B) of the geographic coordinates of known location 101.

As shown in FIG. 1B, even though RTK base station 105 is in fact disposed above known location 101, it erroneously determines its geographic location to be at position 103. To overcome this known error, an operator communicatively couples a GIS data collector (e.g., 111) to RTK base station 105 and programs in the geographic coordinates of known location 101, as well as the antenna height of RTK base station 105. RTK base station 105 then broadcasts the geographic coordinates of known location 101 and the epoch by epoch raw range observations to each visible satellite.

Referring now to FIG. 1C, when in operation, RTK base station 105 periodically broadcasts the geographic coordinates of known location 101 (e.g., once a minute) rather than the geographic coordinates that it independently derived, as well as the epoch by epoch raw range observations to each visible satellite (e.g., once a second). A surveyor then disposes an RTK rover unit 120 at a position 125 to be measured. In order to initiate RTK rover unit 120, the operator must: initialize power to the unit and then, using GIS data collector 111, program RTK rover unit 120 to listen for the broadcast geographic coordinates of RTK base station 105 as well as the observed raw range observations to each visible satellite.

To determine the geographic coordinates of position 125, the operator uses GIS data collector 111 to query RTK rover unit 120 for the geographic coordinates of position 125. RTK rover unit 120 then uses the epoch by epoch observations sent by RTK base station 105 and combines them with its own observations of raw ranges to each of the satellites. RTK rover unit 120 then precisely calculates the relative differential vector 130 using the raw ranges from the base station to each satellite combined with the raw range from the rover to each of the same satellites. RTK rover unit 120 then determines the geographic coordinates of position 125 using the relative baseline vector 130 and the broadcast reference position. In other words, RTK rover unit 120 calculates the latitude, longitude, and elevation of position 125 by adding relative baseline vector 130 to the broadcast base position (e.g., 101) and then correcting for the height of the antennas above the ground.

In an alternative technique, RTK base station 105 is set up at a location and performs a position fix. RTK base station is then configured to broadcast this position. RTK rover unit 120 uses the position broadcast by RTK base station 105 to calculate its own position. However, because the precise geographic coordinates have not been programmed into RTK base station 105, there is a degree of error associated with the position broadcast by RTK base station 105, as well as the position calculated by RTK rover unit 120 based upon the broadcast position of RTK base station 105. RTK rover unit 120 must at some point occupy a known position, perform a position fix, and determine a correction between the geographic coordinates of the known position and the position fix it performed. RTK rover unit 120 then applies this correction to previously measured points to improve the accuracy of determining the geographic coordinates of those points. It is important to note that in this technique, RTK rover unit 120 continues to use the broadcast position from RTK base station 105 in order to determine it position at a given point. It simply applies the correction, once it has been determined, to that position. Thus, the position at which RTK base station 105 is set up becomes a "fixed" geodetic coordinate for a project. In order to get accurate coordinates, the correction must be applied to position fixes made using the broadcast by RTK base station 105, a second position for RTK base station 105 may not be used.

Among the drawbacks of initiating and operating an RTK system as described above is the amount of time needed to properly program both RTK base station 105 and RTK rover unit 120. For example, the operator must wait for RTK base station 105 to initialize and generate position fix 103. The operator then has to communicatively couple GIS data collector 111 with RTK base station 105 and program the geographic coordinates of known position 101. The operator also has to communicatively couple GIS data collector 111 with RTK rover unit 120 and program it to listen for the broadcast data from RTK base station 105. In addition to the time required for these steps to be performed, there is also the possibility of inadvertent operator error in programming the geographic coordinates of known position 105.

Additionally, there are often problems with communicatively coupling GIS data collector 111 with RTK base station 105 and/or RTK rover unit 120. For example, GIS data collector 111 may use a serial cable connection to communicatively couple with either base station 105, or with RTK rover unit 120. However, the serial cables used to communicatively couple GIS data collector 111 with base station 105, or RTK rover unit 120 are prone to breaking, particularly the pins in the cable connectors. Due to the relatively high cost of these cables (e.g., around $200 each) it is not likely that the operator carries spare cables as a backup.

Alternatively, GIS data collector 111 may utilize a wireless system (e.g., the Bluetooth® system) to communicatively couple with base station 105 and/or RTK rover unit 125. It is sometimes difficult to establish a Bluetooth® connection between GIS data collector 111 and RTK base station 105 and/or RTK rover unit 125. It is also sometimes difficult for GIS data collector 111 to establish a Bluetooth® connection with two separate devices (e.g., RTK base station 105 and RTK rover unit 120). Additionally, sometimes the operator may erroneously re-program RTK base station 105 when attempting to program RTK rover unit 120 if the proper procedure is not followed. Finally, it is not uncommon for RTK base station 105 to utilize a serial cable connection while RTK rover unit 120 to utilize a Bluetooth® connection, thus complicating the initiating procedure.

SUMMARY OF THE INVENTION

Embodiments of the present invention recite methods and systems for expediting the initiating of Real-Time Kinematic (RTK) operations. In one embodiment, an RTK base station is disposed at a known location. A broadcast position of the RTK base station is then determined. In embodiments of the present invention, the determining of the broadcast position does not require using the geographic coordinates of said known location.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "disposing," "determining," "broadcasting," "using," "receiving," "comparing," "identifying," "assigning," "utilizing," "ignoring," "accessing," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

RTK Set-up Operations

Figure 1A:
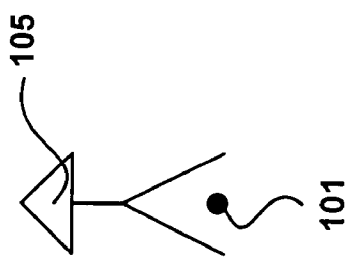
FIGS. 1A, 1B, and 1C show steps in initiating and operating an exemplary conventional RTK system.
Figure 1B:
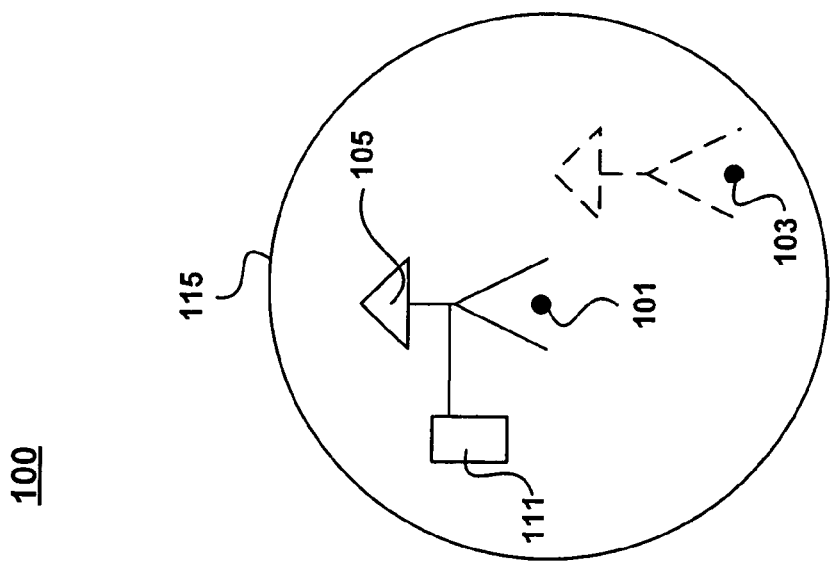
Figure 1C:
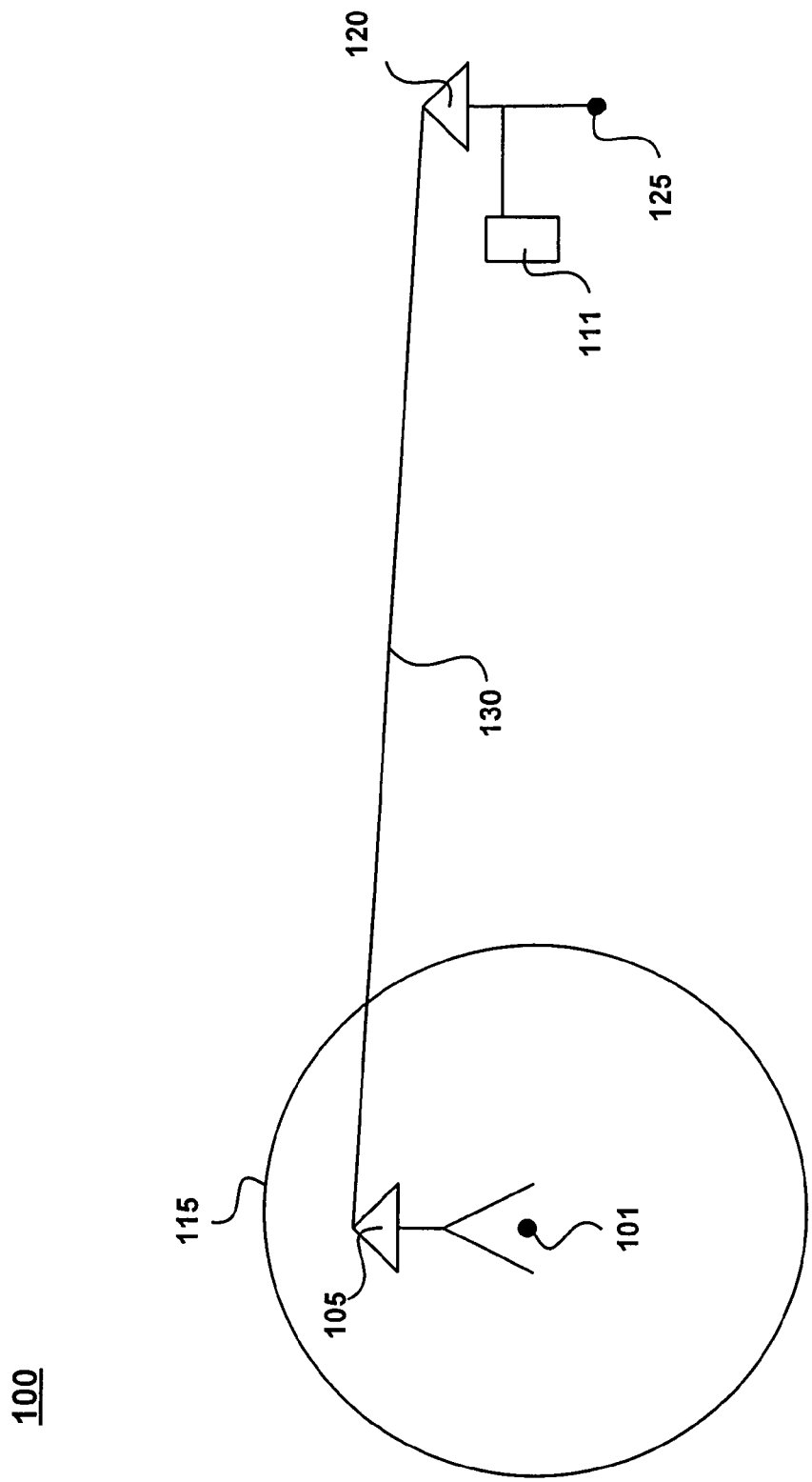
Figure 2A:
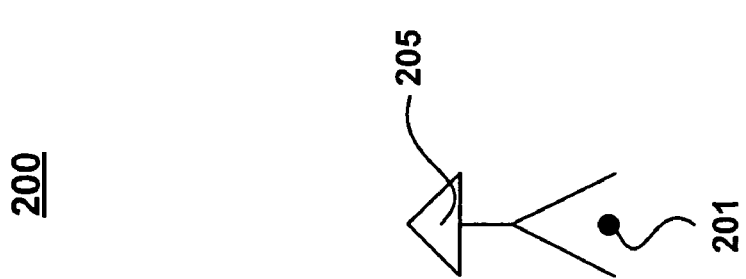
FIGS. 2A, 2B, 2C, 2D, 2E, 2F, and 2G, show steps in initiating and operating an exemplary RTK system in accordance with embodiments of the present invention.
Figure 2B:
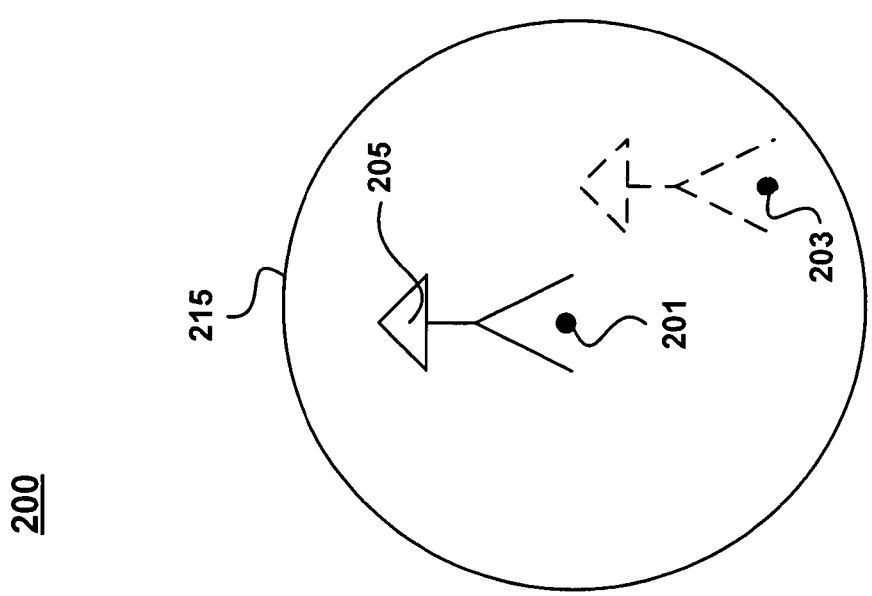

FIGS. 2A, 2B, 2C, 2D, 2E, 2F, and 2G, show steps in initiating and operating an exemplary RTK system in accordance with embodiments of the present invention. FIGS. 2A and 2B discuss setting up and initiating an RTK base station in accordance with embodiments of the present invention. FIGS. 2C, 2D, 2E, 2F, and 2G discuss operating an RTK system in accordance with embodiments of the present invention. With reference to FIG. 2A, an RTK base station 205 is disposed at a known location 201. For the purposes of the present invention, the term "known location" refers to a location which is defined by a surveyed latitude, longitude, and altitude.

In FIG. 2B, RTK base station 205 is initialized and an autonomous position fix is performed. For the purposes of the present invention, the term "autonomous position fix" is an un-aided position fix performed by RTK base station 205 in which the geographic coordinates of known position 201 are not required, used, or programmed into RTK base station 205. Thus, RTK base station does not utilize additional positioning information generated by, for example, a GPS/GNSS reference station, in determining the autonomous position fix. As discussed above, error contributions such as propagation delays, satellite clock errors, GNSS receiver clock errors, satellite position errors, etc., hinder determining the geographic coordinates of RTK base station 205 with the necessary degree of precision. Thus, the autonomous position fix performed by RTK base station 205 is typically within a 10 meter radius (e.g., 215) of known position 201 and results in RTK base station erroneously determining its position as being autonomous position 203. In embodiments of the present invention, RTK base station 205 then broadcasts the geographic coordinates of autonomous position 203 rather than the geographic coordinates of known position 201. In other words, in embodiments of the present invention, there is no requirement to program the geographic coordinates of known position 201 into RTK base station 205.

In embodiments of the present invention, the user simply initiates power to RTK base station 205 to initiate RTK base station operations and RTK base station automatically broadcasts the geographic coordinates of autonomous position 203 as soon as they are determined. In other words, RTK base station 205 automatically performs a self-test routine, and any other start-up operations typically performed when power is initiated, and then automatically determines autonomous position 203 and begins transmitting the geographic coordinates of autonomous position 203 as well as the raw range observations to each visible satellite. Thus, there is no requirement for an operator to couple a GIS data collector (e.g., 211 of FIG. 2D) to RTK base station 205, program in the geographic coordinates of known position 201, and set RTK base station to base mode as is performed in a typical base station set up operation.

As a result, embodiments of the present invention greatly expedite the process of initiating an RTK system. One advantage of the present invention over conventional methods is that the operator is not required to communicatively couple RTK base station 205 with a GIS data collector. As described above, communicatively coupling a GIS data collector may be complicated by the user of serial data connection cables which are prone to physical damage, or via a wireless data connection, which is sometimes difficult to establish properly. Additionally, the time spent setting up and configuring RTK base station 205 is reduced in embodiments of the present invention over conventional methods. Finally, the likelihood of operator error in configuring RTK base station with the geographic coordinates of known position 201 is negligible in embodiments of the present invention In another embodiment of the present invention, RTK base station can be put into operation by initiating the power supply, communicatively coupling with RTK data collector 211, and programming RTK base station to generate autonomous position fix 203 and automatically broadcast the geographic coordinates thereof. Again, initiating RTK base station 205 in this manner is typically considerably faster than a conventional implementation of an RTK network. For example, rather than programming the geographic coordinates of known position 201, the operator can simply configure RTK base station 205 to automatically broadcast the geographic coordinates of autonomous position 203. Again, this reduces the amount of time needed to initiate RTK network operations and reduces the likelihood that the operator will enter an incorrect set of geographic coordinates for known position 201.

Operation of an RTK System in Accordance with the Present Invention

As discussed above, RTK base station 205 broadcasts the autonomous position fix it has determined rather than the geographic coordinates of known position 201. As will be discussed in greater detail below, embodiments of the present invention use the autonomous position broadcast by RTK base station 205 to identify known position 201. A set of stored geographic coordinates are then accessed which define known position 201. In one embodiment of the present invention, the set of stored coordinates are stored in GIS data collector 211.

Figure 2C:
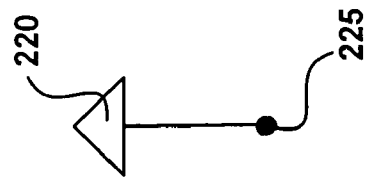
Figure 2C:
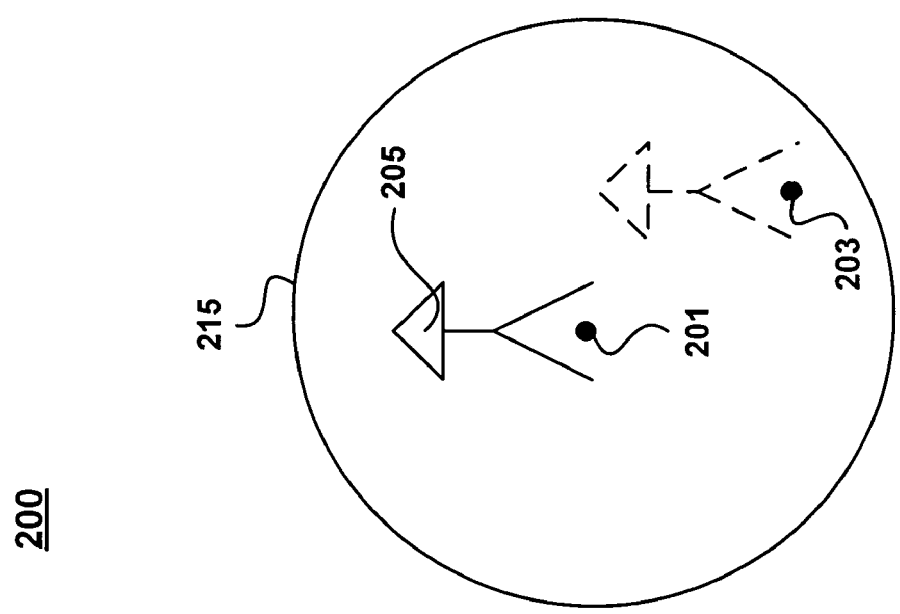

With reference now to FIG. 2C, an RTK rover unit 220 is queried for the geographic coordinates of a position 225. For example, a GIS data collector 211 coupled with RTK rover unit 220 may generate a query for the geographic coordinates of position 225.

Figure 2D:
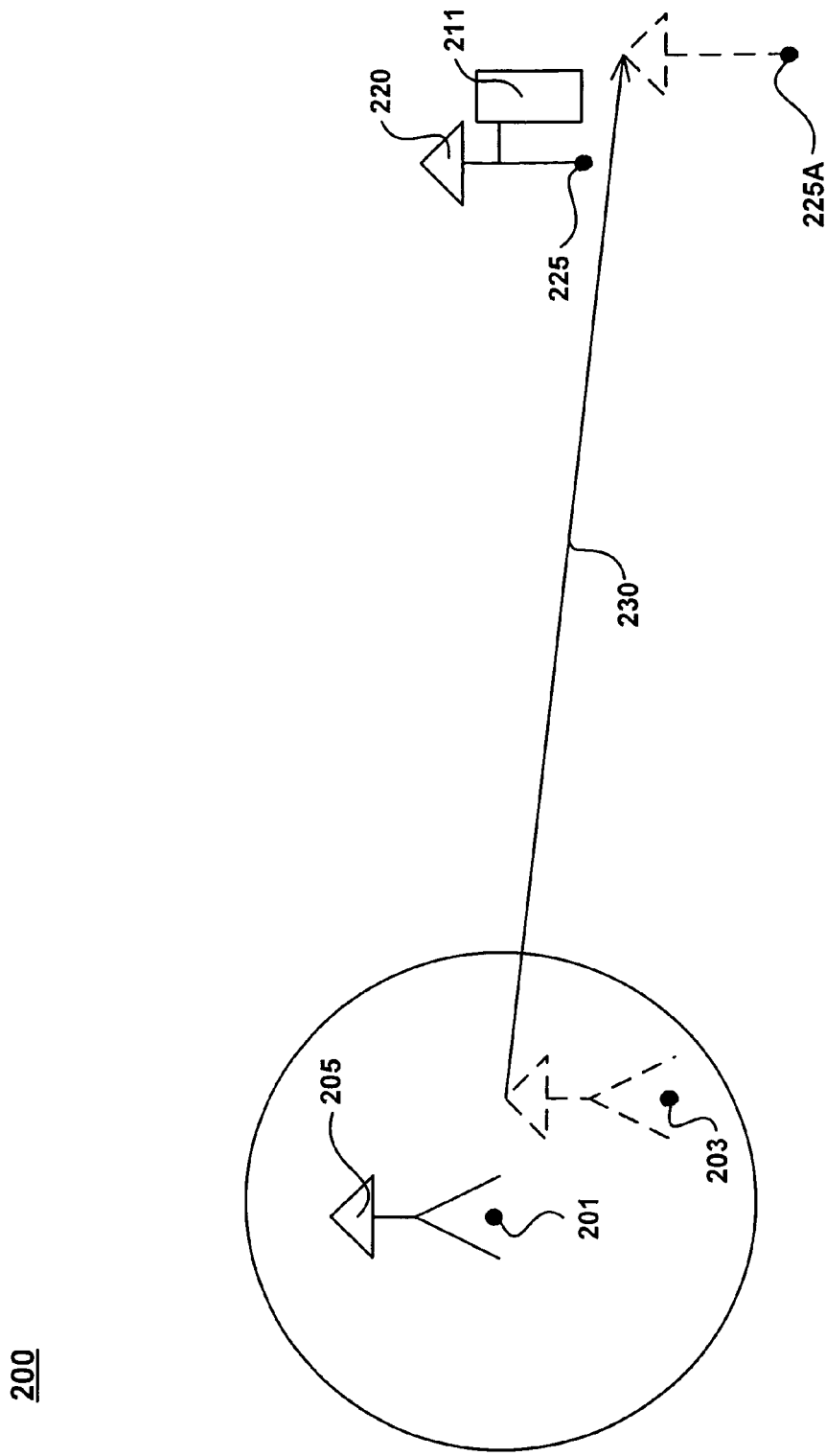

In FIG. 2D, RTK rover unit attempts to determine the geographic coordinates of position 225 based upon the data broadcast from RTK base station 205. However, because RTK base station 205 is erroneously reporting the geographic coordinates of autonomous position 203 as being the geographic coordinates of known position 201, RTK rover unit 220 generates an erroneous position fix 225a based thereon. In other words, RTK rover unit 220 determines the relative baseline vector 230 from autonomous position 203 rather than from known position 201. As a result, an error of determining the geographic coordinates of position 225 is incorrect by the same amount of error in determining the autonomous position 203 of RTK base station 205.

Figure 2E:
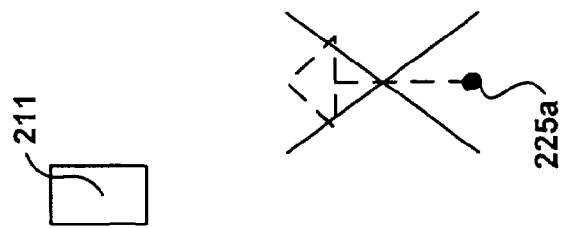
Figure 2E:
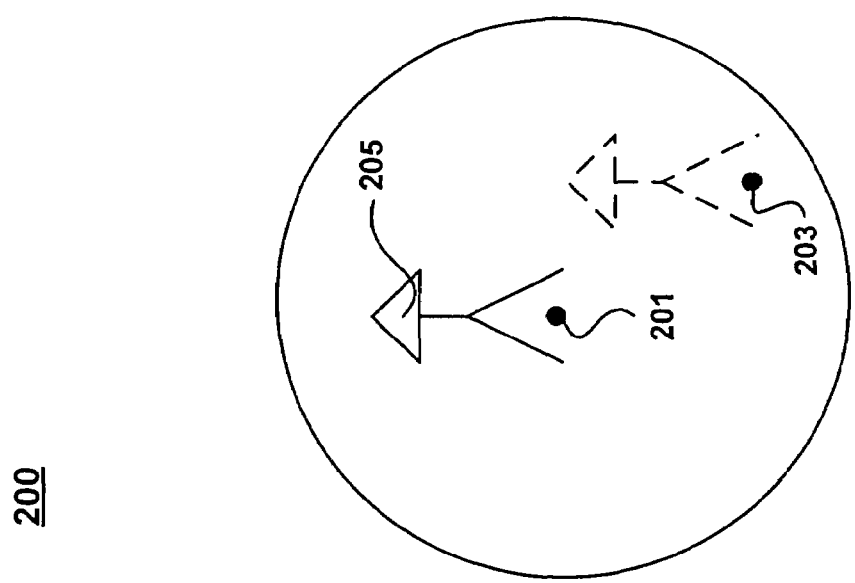

In FIG. 2E, GIS data collector 211 ignores the erroneous position fix 225a generated by RTK rover unit 220 (e.g., RTK rover unit 220 of FIG. 2D). Instead, GIS data collector 211 uses the relative baseline vector (e.g., relative baseline vector 230 of FIG. 2D) and the geographic coordinates of autonomous position fix 203 to determine the geographic coordinates of position 225. In embodiments of the present invention, GIS data collector 211 accesses a database in which the geographic coordinates of known position 201 are stored. In one embodiment, the database may be stored locally on GIS data collector 211. In another embodiment, GIS data collector 211 may communicatively couple with a remotely located database using a wireless communication network. In the present embodiment, GIS data collector 211 then identifies known position 201 based upon the geographic coordinates of autonomous position 203. In one embodiment, GIS data collector 211 determines if the geographic coordinates of autonomous position 203 are within a pre-determined radius of the geographic coordinates of known position 201. In the present embodiment, the pre-determined radius corresponds to radius 215 which describes the precision with which RTK base station 205 can determine its geographic coordinates when performing an autonomous position fix. Thus, if the precision of RTK base station in performing an autonomous position fix can be improved to +/−1 meter, the pre-determined radius used to identify known position 201 may be changed to 1 meter.

In the present embodiment, when GIS data collector 211 determines that the geographic coordinates of autonomous position 203 are within the pre-determined radius (e.g., 215) of the geographic coordinates of known position 201, it determines that RTK base station 205 is in fact disposed over known position 201. In other words, GIS data collector 211 leverages the knowledge that there is a certain error in the precision with which RTK base station 205 can determine its position autonomously. As a result, GIS data collector 211 determines that RTK base station 205 is in fact disposed above known position 201 in spite of the fact that RTK base station 205 is broadcasting the geographic coordinates of autonomous position 203.

Figure 2F:
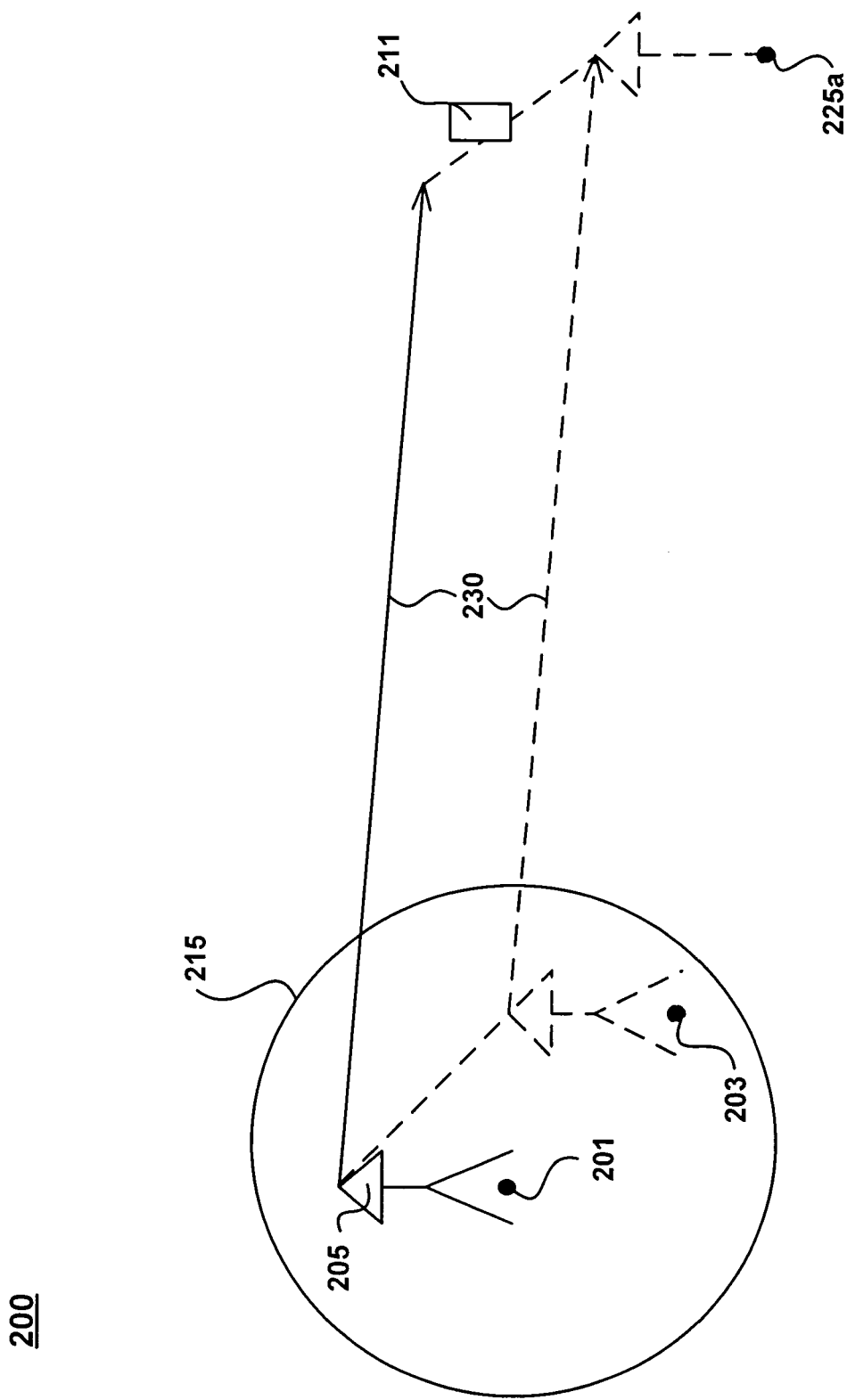

In FIG. 2F, GIS data collector 211 assigns the geographic coordinates of known position 201 as the starting point of relative baseline vector 230. In other words, GIS data collector 211 uses the geographic coordinates of known position 201 accessed above and shifts the start point of relative baseline vector 230 to those geographic coordinates. As a result, relative baseline vector 230 is now associated with the actual position of RTK base station 205 (e.g., known position 201) rather than with autonomous position fix 203.

Figure 2G:
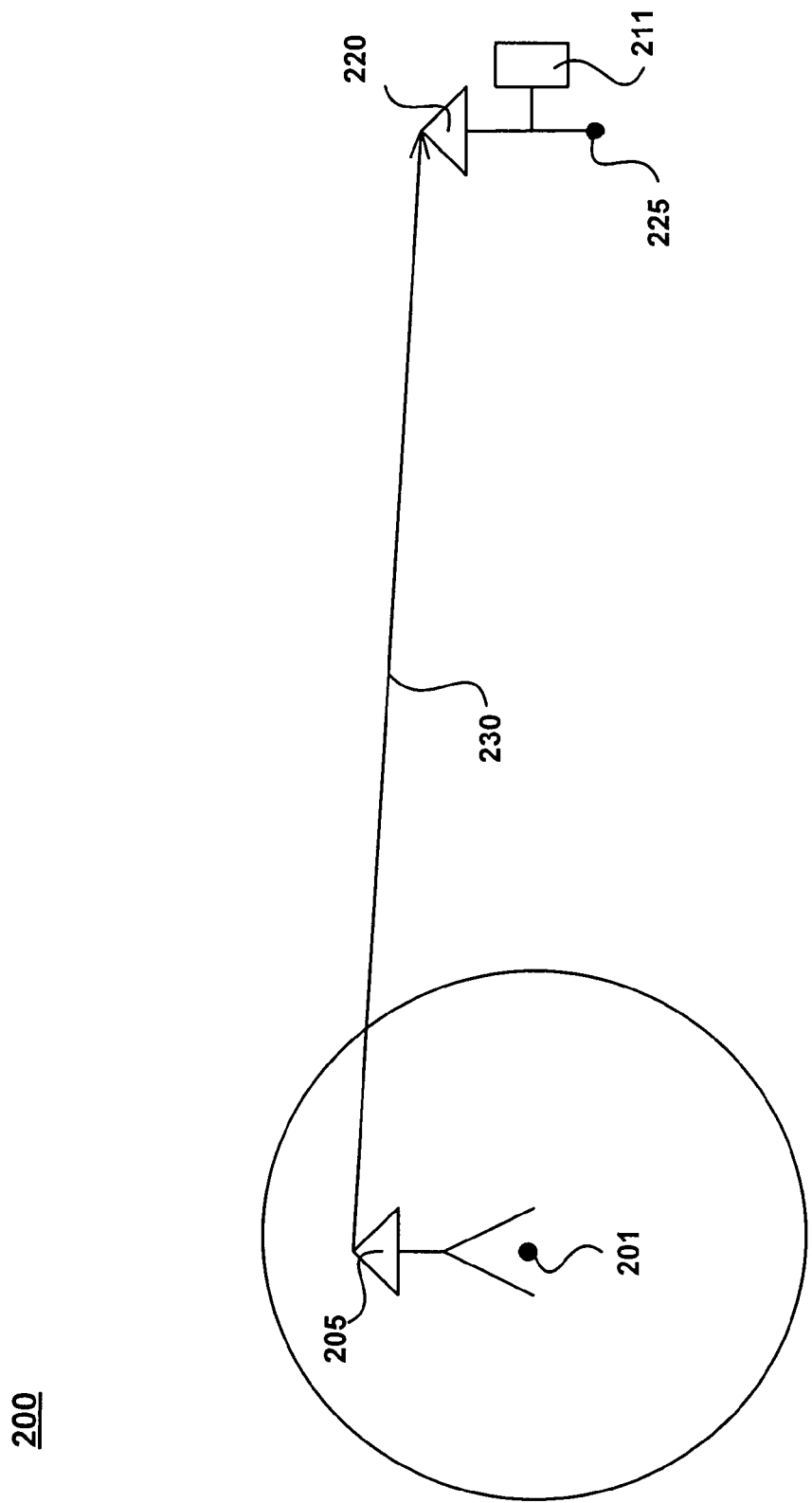

In FIG. 2G, GIS data collector 211 determines the geographic coordinates of position 225 based upon the geographic coordinates of known position 201 and baseline vector 230. It is appreciated that additional data such as the antenna height of RTK base station 205 and RTK rover unit 220 may be used to determine the geographic coordinates of position 225 in embodiments of the present invention.

Figure 3:
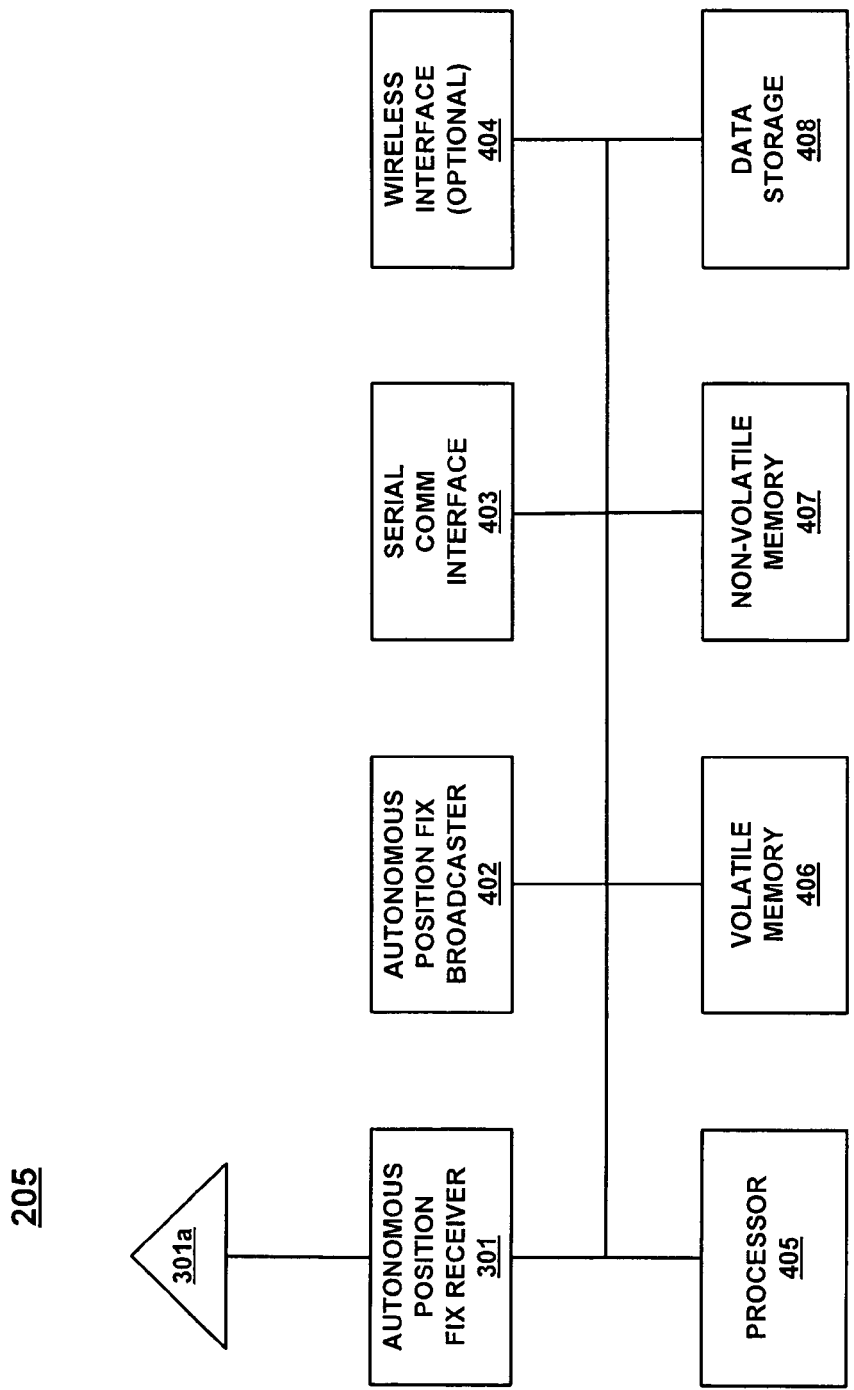
FIG. 3 is a block diagram of an RTK base station in accordance with embodiments of the present invention.

FIG. 3 is a block diagram of an RTK base station (e.g., 205) in accordance with embodiments of the present invention. In the embodiment of FIG. 3, an autonomous position fix receiver 301 is communicatively coupled with an autonomous position fix broadcaster 302. In embodiments of the present invention, autonomous position fix receiver 301 comprises a GNSS/GNSS receiver coupled with an antenna 301a.

In the present embodiment, autonomous position fix broadcaster 302 operates in the UHF spectrum in the range of approximately 450-470 MHz. In another embodiment, autonomous position fix broadcaster 302 operates in the VHF spectrum in the range of approximately 150-170 MHz. In yet another embodiment, autonomous position fix broadcaster 302 is a spread spectrum transceiver and operates in the range of approximately 900 MHz. While the present embodiments recite these frequency ranges specifically, embodiments of the present invention are well suited to operate in other frequency ranges as well, for example, in unlicensed bands such as 2.4 GHz under Part 15 of the FCC Rules (see CFR 47). In another embodiment, autonomous position fix broadcaster 302 utilizes a cellular telephone network (not shown) in order to deliver data to RTK rover unit 220. Alternatively, autonomous position fix broadcaster 302 may utilize an Internet connection (e.g., a wireless Internet connection) to deliver data to RTK rover unit 220.

In the embodiment of FIG. 3, RTK base station 205 further comprises a serial communications interface 303. Serial communications interface 303 is for communicatively coupling RTK base station 205 with another device (e.g., GIS data collector 211) via a serial communications cable.

In the embodiment of FIG. 3, RTK base station 205 further comprises an optional wireless interface 304. In embodiments of the present invention, wireless interface 304 comprises a Bluetooth® wireless communication interface. In another embodiment of the present invention, wireless interface 304 may comprise an IEEE 802.11 compliant wireless interface such as a Wi-Fi® interface. It is noted that in embodiments of the present invention, RTK base station 205 may comprise a variety of combinations of serial communications interface 303 and/or wireless interface 304.

In the embodiment of FIG. 3, RTK base station 205 further comprises a processor 305 for processing digital information and instructions, a volatile main memory 306 comprised of volatile random access memory (RAM) for storing the digital information and instructions, and a non-volatile read only memory (ROM) 307 for storing information and instructions of a more permanent nature. In addition, RTK base station 205 may also include an optional data storage device 308 (e.g., a magnetic, optical, floppy, or tape drive or the like) for storing vast amounts of data.

It is appreciated that various components shown in FIG. 3 may be omitted from RTK base station 205 in embodiments of the present invention. For example, serial communications interface 303 and/or wireless interface 304 may be omitted from RTK base station 205 in embodiments of the present invention. Additionally, processor 306 and/or volatile memory 306, non-volatile memory 307, and data storage 308 may be integrated into autonomous position fix receiver 301, or autonomous position fix broadcaster 302.

As discussed above, in embodiments of the present invention, when power for RTK base station 205 is initiated, autonomous position fix receiver 301 automatically determines the geographic coordinates of autonomous position 203. In one embodiment, autonomous position fix broadcaster 302 then automatically broadcasts the geographic coordinates of autonomous position 203, as well as the raw range observations to visible satellites. In another embodiment, an operator can communicatively couple GIS data collector 211 (e.g., via serial communications interface 303 and/or wireless interface 304) and configure RTK base station 205 to begin broadcasting the geographic coordinates of autonomous position 203 for use by an RTK rover unit 220. In other words, RTK base station is set to base mode.

Figure 4:
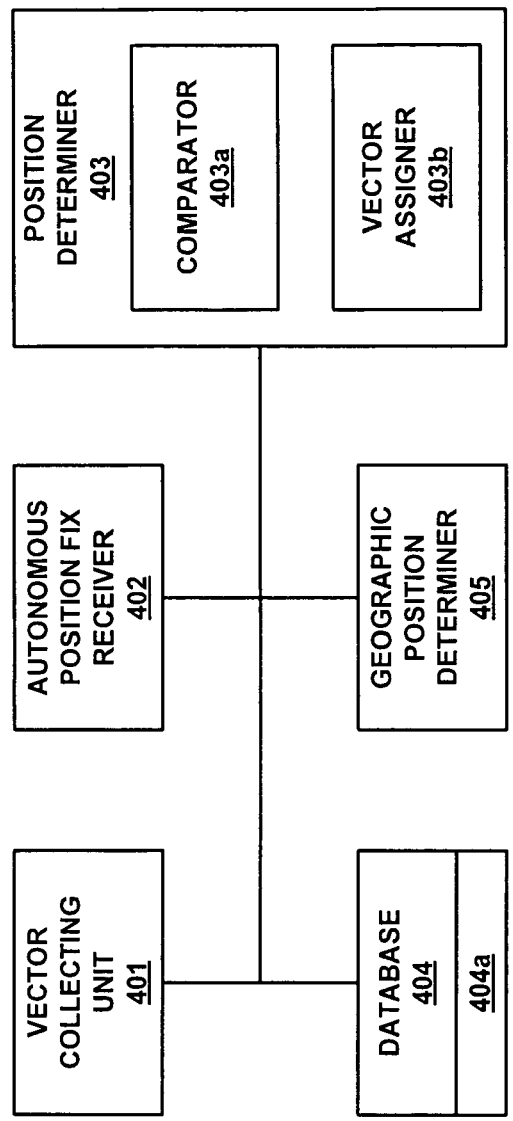
FIG. 4 is a block diagram of an exemplary Real-Time Kinematic (RTK) position determining system in accordance with embodiments of the present invention.

FIG. 4 is a block diagram of an exemplary Real-Time Kinematic (RTK) position determining system 400 in accordance with embodiments of the present invention. It is noted that, in the present embodiment, RTK position determining system 400 is implemented in a GIS data collector (e.g., 211 of FIG. 2). In other embodiments, RTK position determining unit 400 is implemented in a mobile electronic device (not shown) which is communicatively coupleable with RTK rover unit 220, or in a computer system operated by a user of system 400.

In the embodiment of FIG. 4, RTK position determining system 400 comprises a vector collecting unit 401 coupled with an autonomous position fix receiver 402, a position determiner 403, a database 404, and a geographic position generator 405.

In the embodiment of FIG. 4, vector collecting unit 401 is for collecting a vector describing the location of an RTK rover unit with relative to an autonomous position fix. Referring again to FIG. 2F, GIS data collector 211 uses vector collecting unit 401 to receive relative baseline vector 230 from RTK rover unit 220. Autonomous position fix receiver 402 is for receiving the geographic coordinates of an autonomous position fix (e.g., 203). Referring again to FIG. 2F, GIS data collector 211 uses autonomous position fix receiver 402 to receive the geographic coordinates of autonomous position 203 from RTK rover unit 220.

In the embodiment of FIG. 4, position determiner 403 comprises a comparator 403a and a vector assigner 403b. Comparator 403a is for comparing an autonomous position fix received via autonomous position fix receiver 402 with a set of geographic coordinates (e.g., 404a) stored in database 404. More specifically, comparator 403a compares the geographic coordinates of autonomous position 203 with a set of geographic coordinates which describe known location 201 at which an RTK base station 205 is actually located. In embodiments of the present invention, comparator 403a accesses database 404 and compares the geographic coordinates of autonomous position 203 with the geographic coordinates stored in database 404.

In one embodiment of the present invention, comparator 403a determines whether the geographic coordinates of autonomous position 203 are within a pre-determined radius (e.g., 215) of the geographic coordinates of known position 201. In one embodiment of the present invention, pre-determined radius 215 corresponds to the known error factor in precisely determining an autonomous position fix for RTK base station 205. If comparator 403a determines that the geographic coordinates of autonomous position 203 are within the pre-determined radius 215 of the geographic coordinates of known position 201, it determines that RTK base station 205 is in fact disposed over known position 205 rather than over autonomous position 203 as reported. In one embodiment, comparator 403a then sends the geographic coordinates of known position 201 to vector assigner 403b.

In one embodiment of the present invention, vector assigner 403b is for assigning the set of geographic coordinates of known position 201 as a start position for vector 230. Thus, using known position 201 as the start point, a vector having the same magnitude and direction as relative baseline vector 230 is generated. Referring again to FIG. 2F, it is shown that relative baseline vector 230 has been shifted such that its start point is no longer based upon the geographic coordinates of autonomous position 203, but instead is based upon the geographic coordinates of known position 201. Using this information, geographic position generator 405 generates a new set of geographic coordinates for position 225 based upon the geographic coordinates of known position 201 and relative baseline vector 230. In so doing, the geographic coordinates of position 225 are generated by RTK position determining system 400.

Figure 5:
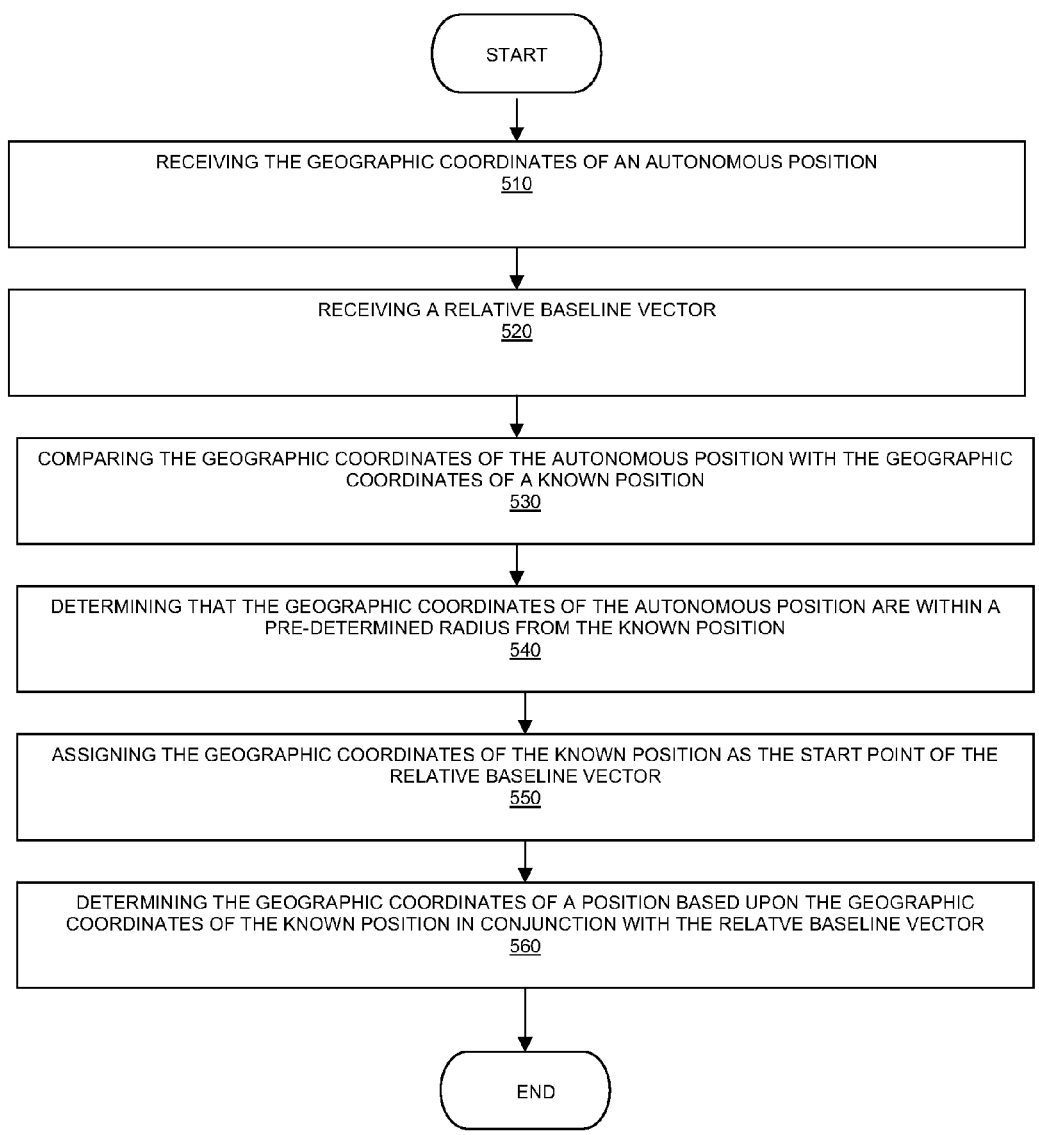
FIG. 5 is a flowchart of a method implemented by a Real-Time Kinematic (RTK) position determining system in accordance with embodiments of the present invention.

FIG. 5 is a flowchart of a method 500 implemented by Real-Time Kinematic (RTK) position determining system 400 in accordance with embodiments of the present invention. In step 510 of FIG. 5, the geographic coordinates of an autonomous position are received. Referring again to FIG. 2E, Real-Time Kinematic (RTK) position determining system 400 receives the geographic coordinates of autonomous position 203 from RTK rover unit 220.

In step 520 of FIG. 5, a relative baseline vector is received. Referring again to FIG. 2E, Real-Time Kinematic (RTK) position determining system 400 receives relative baseline vector 230 from RTK rover unit 220.

In step 530 of FIG. 5, the geographic coordinates of the autonomous position are compared with geographic coordinates of a known position. Referring again to FIG. 2E, Real-Time Kinematic (RTK) position determining system 400 compares the geographic coordinates of autonomous position 203 with the geographic coordinates of known position 201.

In step 540 of FIG. 5, it is determined that the geographic coordinates of the autonomous position are within a pre-determined radius of the geographic coordinates from the known position. Referring again to FIG. 2E, Real-Time Kinematic (RTK) position determining system 400 determines that the geographic coordinates of autonomous position 203 are within the pre-determined radius (e.g., 215) from known position 201.

In step 550 of FIG. 5, the geographic coordinates of the known position are assigned as the start point of the relative baseline vector. Referring again to FIG. 2F, GIS data collector 211 assigns the geographic coordinates of known position 201 as the starting point of relative baseline vector 230.

In step 560 of FIG. 5, the geographic coordinates of a position are determined based upon the geographic coordinates of the known position in conjunction with the relative baseline vector. Referring again to FIG. 2G, GIS data collector 211 determines the geographic coordinates of position 225 based upon the geographic coordinates of known position 201 and baseline vector 230.

Figure 6:
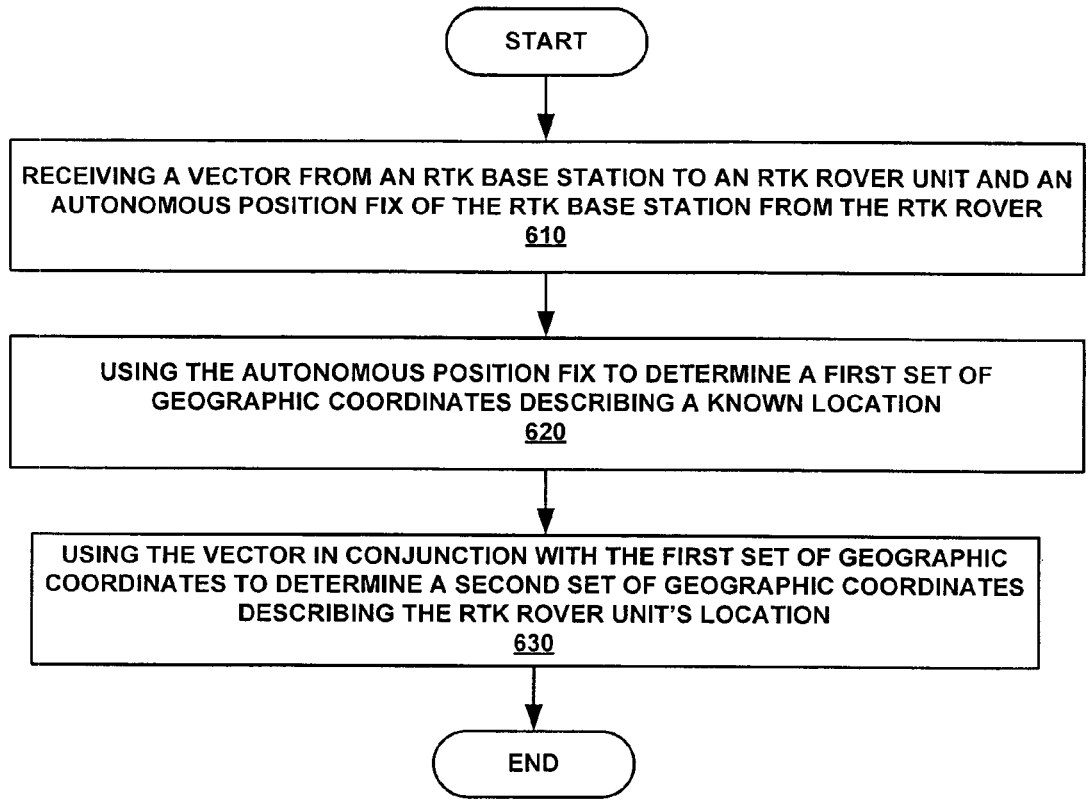
FIG. 6 is a flowchart of a method for determining the geographic position of a Real-Time Kinematic (RTK) rover unit in accordance with embodiment of the present invention.

FIG. 6 is a flowchart of a method 600 for determining the geographic position of a Real-Time Kinematic (RTK) rover unit in accordance with embodiment of the present invention. In step 610 of FIG. 6, a vector from an RTK base station to an RTK rover unit, and an autonomous position fix of the RTK base station, is received from the RTK rover unit. As described above, Real-Time Kinematic (RTK) position determining system 400 may be coupled with RTK rover unit 220 and generate a query for the current position. However, rather than using the geographic coordinates supplied by RTK rover unit 220, which is erroneously based upon the reported autonomous position fix 203, embodiments of the present invention simply use the autonomous position fix 203 and relative baseline vector 230 to generate a separate solution.

In step 620 of FIG. 6, the autonomous position fix is used to determine a first set of geographic coordinates describing a known location. As described above, the geographic coordinates of autonomous position fix 203 are used to identify known position 201. Then, the geographic coordinates of known location 201 are accessed and compared with the geographic coordinates of autonomous position 203. In embodiments of the present invention, if the geographic coordinates of the autonomous position (e.g., 203) are within a pre-determined radius (e.g., 215) of the geographic coordinates of known location 201, Real-Time Kinematic (RTK) position determining system 400 determines that RTK base station 205 is in fact disposed above known location 201.

In step 630 of FIG. 6, the vector is used in conjunction with the first set of geographic coordinates to determine a second set of geographic coordinates describing the RTK rover unit's location. In embodiments of the present invention, Real-Time Kinematic (RTK) position determining system 400 assigns the geographic coordinates of known location 201 as the starting point of the vector from RTK base station 205 to, for example, RTK rover unit 220. In other words, embodiments of the present invention use the geographic coordinates of known location 201 instead of the geographic coordinates of autonomous position 203 to identify the geographic coordinates of the position (e.g., 201) at which RTK base station 205 is disposed.

Figure 7:
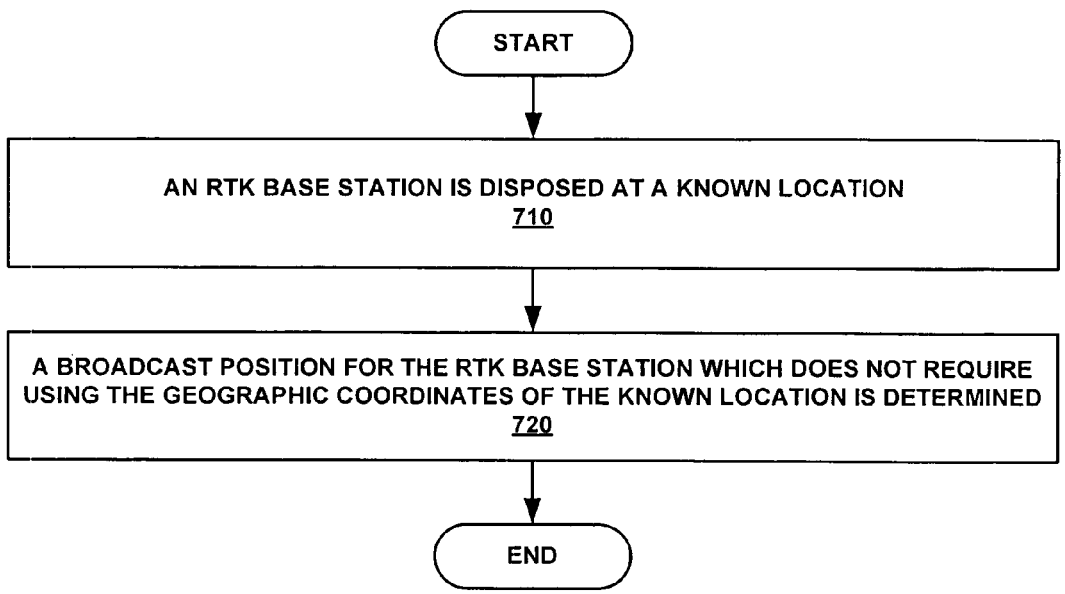
FIG. 7 is a flowchart of a method for expediting the initiating of Real-Time Kinematic (RTK) network operations in accordance with embodiments of the present invention.

FIG. 7 is a flowchart of a method 700 for expediting the initiating of Real-Time Kinematic (RTK) network operations in accordance with embodiments of the present invention. In step 710 of FIG. 7, an RTK base station is disposed at a known location. As shown in FIG. 2A, RTK base station 205 is disposed above known location 201.

In step 720 of FIG. 7, a broadcast position for the RTK base station which does not require using the geographic coordinates of the known location is determined.

As discussed above, due to the error propagation in autonomously determining the geographic coordinates of RTK base station 205, there is a requirement in conventional RTK systems for an operator to manually enter the geographic coordinates of known position 201. This is both time consuming, and subject to difficulties in communicatively coupling a GIS data collector (e.g., 211) with the RTK base station (e.g., 205). As a result, embodiments of the present invention reduce the amount of time used to set up an RTK base station for operation and therefore expedite the initiating of RTK network operations.

Figure 8:
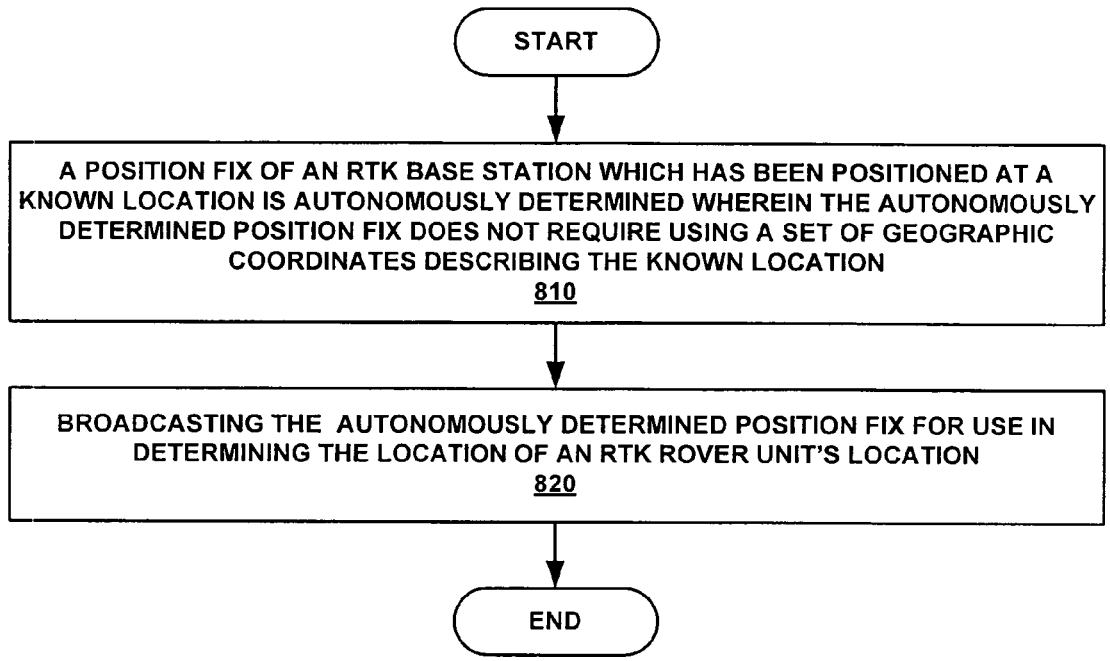
FIG. 8 is a flowchart of a method for performing Real-Time Kinematic (RTK) network operations in accordance with embodiments of the present invention.

FIG. 8 is a flowchart of a method for performing Real-Time Kinematic (RTK) network operations in accordance with embodiments of the present invention. In step 810 of FIG. 8, a position fix of an RTK base station which has been positioned at a known location is autonomously determined wherein the autonomously determined position fix does not require using a set of geographic coordinates describing the known location.

In step 820 of FIG. 8, the autonomously determined position fix is broadcast for use in determining an RTK rover unit's location. With reference again to FIG. 2B, RTK base station 205 begins broadcasting the geographic coordinates of autonomous position 201. As a result, there is no requirement for an operator to access RTK base station 205 and manually enter the geographic coordinates of known position 201 using, for example, GIS data collector 211.

The preferred embodiment of the present invention, a method and system for initiating Real-Time Kinematic network operations, is thus described. While the present invention has been described in particular embodiments, it should be appreciated that the present invention should not be construed as limited by such embodiments, but rather construed according to the following claims.

What is claimed is:

1. A method for expediting the initiating of Real-Time Kinematic (RTK) network operations, said method comprising:
   disposing an RTK base station at a known location;
   determining a broadcast position for said RTK base station and wherein said determining does not require using the geographic coordinates of said known location.

2. The method as recited in claim 1 wherein said determining comprises:
   determining an autonomous position fix of said RTK base station.

3. The method as recited in claim 2 further comprising:
   automatically determining said autonomous position fix in response to initiating said RTK base station.

4. The method as recited in claim 3 further comprising:
   automatically broadcasting said autonomous position fix in response to said determining said autonomous position fix.

5. A method for performing Real-Time Kinematic (RTK) network operations; said method comprising:
   autonomously determining a position fix of an RTK base station which has been positioned at a known location and wherein said autonomously determined position fix does not require using a first set of geographic coordinates describing said known location; and
   automatically broadcasting said autonomously determined position fix for use in determining an RTK rover unit's location.

6. The method as recited in claim 5 further comprising:
   determining a vector describing said RTK rover unit's location with respect to said RTK base station.

7. The method as recited in claim 6 further comprising:
   using a portable electronic device to determine a second set of geographic coordinates describing said RTK rover unit's location based upon said vector and said autonomously determined position fix.

8. The method as recited in claim 7 wherein said using said portable electronic device to determine said second set of geographic coordinates further comprises:
   said portable electronic device receiving said vector and autonomously determined position fix from said RTK rover unit;
   said portable electronic device automatically comparing said autonomously determined position fix with said first set of geographic coordinates describing said known location; and
   said portable electronic device identifying said known location based upon said comparing.

9. The method as recited in claim 8 wherein said identifying further comprises:
   determining that said autonomously determined position fix is within a pre-determined radius from said first set of geographic coordinates describing said known location.

10. The method as recited in claim 8 further comprising:
    assigning said first set of geographic coordinates as the starting point of said vector.

11. The method as recited in claim 6 further comprising:
    determining said second set of geographic coordinates without requiring use of an estimated position fix generated by said RTK rover unit.

12. The method as recited in claim 5 further comprising:
    said RTK base station automatically determining said autonomous position fix of said RTK base station in response to initiating power for said RTK base station.

13. A method for determining a geographic position; said method comprising:
    receiving a vector from an RTK base station to an RTK rover unit and an autonomous position fix of said RTK base station from said RTK rover unit, and wherein said autonomous position fix does not comprise a first set of geographic coordinates describing a known location proximate to said RTK base station;
    using said autonomous position fix to determine said first set of geographic coordinates describing said known location; and
    using said vector in conjunction with said first set of geographic coordinates to determine a second set of geographic coordinates describing said RTK rover unit's location.

14. The method as recited in claim 13 further comprising:
    receiving an estimated position fix of said RTK rover unit; and
    ignoring said estimated position fix.

15. The method as recited in claim 13 further comprising:
    assigning said first set of geographic coordinates as a starting point of said vector.

16. The method as recited in claim 13 wherein said using said autonomous position fix to access said first set of geographic coordinates for said known location further comprises:
    accessing a database comprising said first set of geographic coordinates;
    comparing said autonomous position fix with said first set of geographic coordinates; and
    associating said autonomous position fix with said first set of geographic coordinates.

17. The method as recited in claim 16 wherein said associating said autonomous position fix with said first set of geographic coordinates further comprises:
    determining that said autonomous position fix is within a pre-determined radius from said first set of geographic coordinates.

18. The method as recited in claim 13 wherein said receiving said autonomous position fix of said RTK base station further comprises:

receiving said autonomous position fix from an RTK base station configured to automatically broadcast said autonomous position fix in response to determining said autonomous position fix.

19. A Real-Time Kinematic (RTK) position determining system comprising:
- a vector collecting unit;
- an autonomous position fix receiver communicatively coupled with said vector collecting unit; and
- a position determiner communicatively coupled with said vector collecting unit and with said autonomous position fix receiver and comprising a comparator for comparing an autonomous position fix received via said autonomous position fix receiver with a first set of geographic coordinates stored in said database describing a known location at which an RTK base station is located; and
- a database communicatively coupled with said position determiner.

20. The Real-Time Kinematic (RTK) position determining system of claim 19 wherein said comparator is further for determining that said autonomous position fix is within a pre-determined radius of said first set of geographic coordinates.

21. The Real-Time Kinematic (RTK) position determining system of claim 20 wherein said vector collector is for collecting a vector describing the location of an RTK rover unit with relative to said autonomous position fix.

22. The Real-Time Kinematic (RTK) position determining system of claim 21 wherein said position determiner further comprises:
- a vector assigner for assigning said first set of geographic coordinates as a start position for said vector.

23. The Real-Time Kinematic (RTK) position determining system of claim 22 further comprising:
- a geographic position generator coupled with said vector assigner for generating a second set of geographic coordinates based upon said first set of geographic coordinates and said vector.

* * * * *